No. 623,224. Patented Apr. 18, 1899.
E. J. STODDARD.
GAS MOTOR ENGINE.
(Application filed Jan. 23, 1897. Renewed Sept. 7, 1898.)
(No Model.)
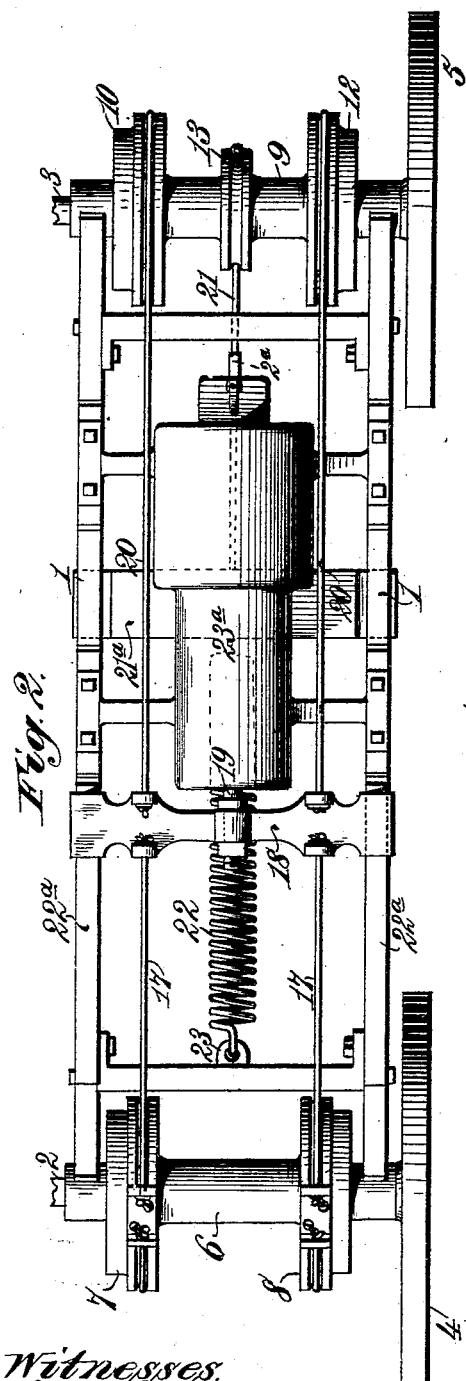
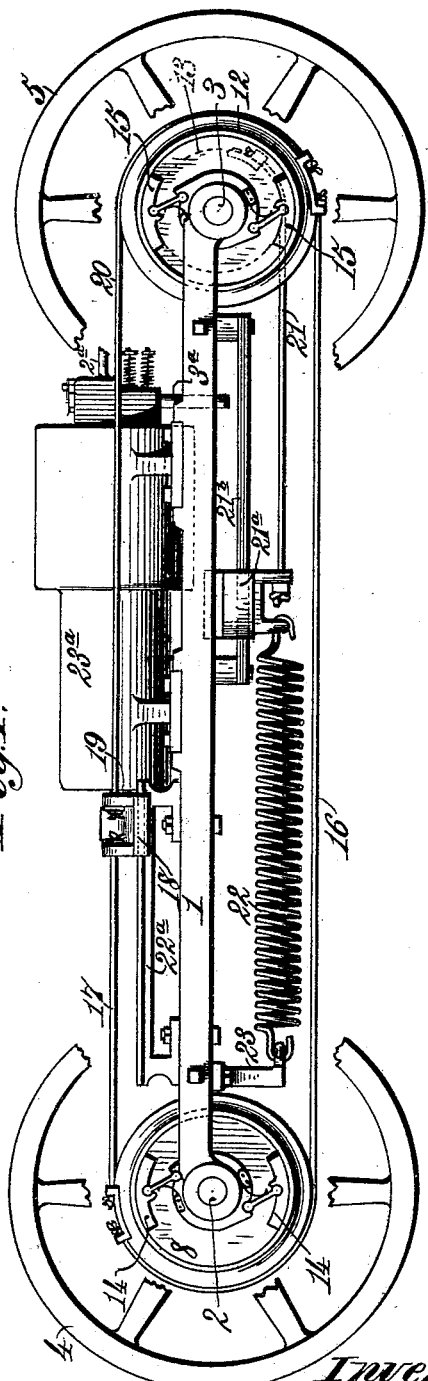
Witnesses,
Robert Garratt,
Albert H. Norris.
Inventor,
Elliott J. Stoddard.
By James L. Norris,
Atty.

UNITED STATES PATENT OFFICE.

ELLIOTT J. STODDARD, OF DETROIT, MICHIGAN, ASSIGNOR TO THE HENRY C. HART MANUFACTURING COMPANY, OF SAME PLACE.

GAS-MOTOR ENGINE.

SPECIFICATION forming part of Letters Patent No. 623,224, dated April 18, 1899.

Application filed January 23, 1897. Renewed September 7, 1898. Serial No. 690,443. (No model.)

*To all whom it may concern:*

Be it known that I, ELLIOTT J. STODDARD, a citizen of the United States, residing at Detroit, in the county of Wayne and State of Michigan, have invented new and useful Improvements in Gas-Motor Engines, of which the following is a specification.

This invention relates to free-flying-piston engines operated by explosions of gaseous or explosive mixture to secure power for propelling wheeled vehicles or driving machinery. An engine of this character is ordinarily more or less noisy in action and its unbalanced motions are very objectionable.

The chief object of my present invention is to secure practically noiseless action and equilibrate the motion of the engine during the forward flight of the piston in that class of power mechanism wherein the free-flying piston of a gas-motor engine energizes a spring which effects the back strokes of the piston and transmits motion to a rotary shaft or wheel adapted to be arranged in operative connection with a machine, vehicle, or other apparatus which is to be driven or operated. To accomplish this object, my invention consists, essentially, in the combination, with a free-flying-piston gas-engine and means for rotating a shaft as the piston moves, of an equilibrating-weight having a rectilinear motion opposite to that of the piston in its flight for balancing the motion of the engine, particularly during the flight of the piston.

The invention also consists in the features of construction and the combination or arrangement of parts hereinafter described and claimed, reference being made to the accompanying drawings, in which—

Figure 1 is a broken side elevation of a gas-motor engine embodying my invention, and Fig. 2 is a plan view of the same.

In order to enable those skilled in the art to make and use my invention, I will now describe the same in detail, referring to the drawings, wherein the numeral 1 indicates an engine-frame, which may be of any construction suitable for the purpose in hand. The ends of the frame support two transverse shafts 2 and 3, arranged parallel with each other and provided with wheels 4 and 5, which may be the wheels of a vehicle. The shaft 2 carries a sleeve 6, having pulleys 7 and 8 at its end portions, and the shaft 3 carries a sleeve 9, having pulleys 10, 12, and 13. The sleeves and pulleys above mentioned are susceptible of freely turning in one direction independently of the shafts 2 and 3; but are prevented from turning in the opposite direction independent of the shafts through the medium of clutches 14 and 15 of any suitable construction.

The lower sides of the pulleys 8 and 12 and the lower sides of the pulleys 7 and 10 are positively connected by flexible connections 16, and the upper sides of the pulleys 7 and 8 are connected by flexible connections 17 with a cross-head 18, attached to the piston-rod 19 of a free-flying-piston gas-engine $23^a$. As this engine may be of any known or suitable construction and possess any proper inlet and exhaust pipes or passages $2^a$ and $3^a$, governed by valves, as usual, I do not deem it necessary to more fully explain the gas-engine proper.

The cross-head 18 is connected by flexible connections 20 with the upper sides of the pulleys 10 and 12, so that when the cross-head is reciprocated the pulleys turn in unison.

The pulley 13 is connected by a flexible connection 21 with a balance-weight $21^a$, movable upon and guided by an approximately horizontal guideway $21^b$. The balance-weight is also connected with one end of a suitable power-spring 22, which has its other end connected with a stationary part 23, which may be a part of the engine-frame or a part of the body of a wheeled vehicle. The balance-weight is designed to secure practically noiseless action and equilibrate the motion of the engine, particularly during the forward flight of the free-flying piston.

The flexible connections 16, 17, and 20 above referred to are secured at one end to the pulleys 7, 8, 10, and 12 by any suitable means, and the same remarks apply to the end of the connection 21 which is attached to the pulley 13.

The flexible connections referred to may be ordinary ropes, wire cables, or suitable bands or belts.

The cross-head 18 travels upon a horizontal guideway 22ª, attached to or forming a part of the frame of the engine, and upon this frame is mounted in any desired manner the cylinder of the gas-motor engine, the latter having a free-flying piston (not shown) connected with the piston-rod 19.

In practice the explosive mixture is introduced into the cylinder of the gas-engine and ignited in any suitable manner. The expansive force of the explosion drives the free-flying piston forward, and as the piston makes its working stroke the equilibrating-weight is moved in a direction opposite the direction in which the piston is moving, so that the power-spring 22 is swiftly stretched and placed under tension, in consequence of which the piston is drawn back to normal position by the action of the spring. When this occurs, the shafts 2 and 3 are rotated through the medium of the pulleys and clutches hereinbefore described. The rotary motion of the shafts may be utilized to propel a vehicle or drive machinery or any apparatus.

In the to-and-fro motions of the piston and the upper and lower stretches of cables or ropes the equilibrating-weight 21ª traverses the guideway 21ᵇ, which is arranged in a plane parallel with the plane of the guideway for the cross-head 18. The equilibrating-weight may be made in the form of a cross-head, with its end portions engaging guides or ways, as best seen in Fig. 2, and the flexible connection 21 may be secured to the center of the cross-head. This cross-head, constituting the balance-weight, should be as much greater in weight than the total weight of the cross-head 18, piston-rod 19, and engine-piston as the velocity of the last-mentioned parts is greater than the velocity of the weight.

Inasmuch as all the parts are positively connected and work in the frame of the engine and the quantity of motion in one direction is equal to the quantity of motion in the opposite direction, equilibration in the motions of the working parts of the engine is secured and noise and lost motion incident to the use of toggle-joints or jointed rods in power-transmitting mechanisms are avoided.

I do not broadly claim the combination, with a cylinder and a free-flying piston, of separated pulleys or wheels positively connected to turn in unison and operatively connected with the free-flying piston and a spring placed under tension by the working stroke of the piston, as such combination is not my invention.

Having thus described my invention, what I claim is—

1. The combination with a free-flying-piston gas-engine, and means for rotating a shaft as the piston moves, of a power-spring placed under tension by the movement of the piston in one direction, and an equilibrating-weight connected with said power-spring and having a rectilinear motion opposite to that of the piston in its flight, the power-spring serving to move the weight in one direction, substantially as described.

2. The combination with a gas-engine having a free flying-piston, a spring engaged by and solely resisting the forward flight of the piston, and means for rotating a shaft as the piston moves, of an equilibrating-weight connected with said spring and moved in one direction by the recoil of said spring, substantially as described.

3. The combination with a cylinder having a piston, of separated pulleys connected by a flexible connection and operatively connected with the engine-piston, a power-spring, and an equilibrating-weight connected with the power-spring and moved to and fro as the pulleys oscillate, substantially as described.

4. The combination with a cylinder having a free-flying piston, of separated pulleys connected by a flexible connection and operatively connected with the engine-piston, a power-spring, and an equilibrating-weight connected with the power-spring and moved to and fro as the pulleys oscillate, substantially as described.

5. The combination with a cylinder having a free-flying piston, of separated pulleys connected by a flexible connection and operatively connected with the engine-piston, a power-spring, and an equilibrating-weight operatively connected with said spring and said pulleys and movable to and fro as the pulleys oscillate, substantially as described.

6. The combination with a cylinder having a piston, of separated pulleys connected to turn in unison and operatively connected with the engine-piston, a power-spring, and an equilibrating-weight operatively connected with said spring and said pulleys, substantially as described.

7. The combination with a cylinder having a piston, of separated pulleys connected to turn in unison and operatively connected with the engine-piston, a power-spring, a guideway, and an equilibrating-weight movable to and fro upon said guideway and operatively connected with the spring and pulleys, substantially as described.

8. The combination with a cylinder having a piston, rotary shafts, pulleys or wheels connected to turn in unison and operatively connected with the engine-piston, clutches which permit the pulleys or wheels to turn in one direction independently of the shafts, and a power-spring, of an equilibrating-weight operatively connected with said spring and said pulleys to balance the motions of the working parts, substantially as described.

9. The combination with a cylinder having a free-flying piston, separated pulleys or wheels connected to turn in unison and operatively connected with the engine-piston, and a power-spring, of an equilibrating-weight connected with the power-spring and operatively connected with said pulleys to balance the motions of the working parts, substantially as described.

10. The combination with a free-flying-piston engine, two shafts provided with pulleys or wheels, clutches arranged in operative connection with the pulleys or wheels and acting in the same direction on the shafts, a flexible connection between the pulleys, flexible connections between the pulleys and the engine-piston, and a power-spring, of a reciprocatory equilibrating-weight operatively connected with the spring and the pulleys or wheels, substantially as described.

In testimony whereof I have hereunto set my hand in presence of two subscribing witnesses.

ELLIOTT J. STODDARD.

Witnesses:
HENRY C. HART,
ROBERT W. HART.